(12) United States Patent
Ma

(10) Patent No.: US 8,282,409 B2
(45) Date of Patent: Oct. 9, 2012

(54) ELECTRICAL CONNECTOR WITH LATCHES HOLDING MODULE IN PLACE

(75) Inventor: Hao-Yun Ma, Santa Clara, CA (US)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 207 days.

(21) Appl. No.: 12/777,234

(22) Filed: May 10, 2010

(65) Prior Publication Data
US 2010/0291784 A1 Nov. 18, 2010

(51) Int. Cl.
*H01R 13/62* (2006.01)
(52) U.S. Cl. .................................................. 439/328
(58) Field of Classification Search .................. 439/328, 439/327, 630
See application file for complete search history.

(56) References Cited

U.S. PATENT DOCUMENTS

| | | | | |
|---|---|---|---|---|
| 3,823,367 A | * | 7/1974 | Kaye et al. | 324/426 |
| 3,917,372 A | * | 11/1975 | Selinko | 439/298 |
| 4,445,742 A | * | 5/1984 | Fullam | 439/597 |
| 4,724,310 A | * | 2/1988 | Shimamura et al. | 235/483 |
| 4,931,622 A | * | 6/1990 | Ohtsuki et al. | 235/487 |
| 5,033,972 A | * | 7/1991 | Komatsu et al. | 439/153 |
| 5,151,847 A | * | 9/1992 | Rautenberg | 361/737 |
| 5,155,663 A | * | 10/1992 | Harase | 361/679.31 |
| 5,220,520 A | * | 6/1993 | Kessoku | 361/679.31 |
| 5,427,534 A | * | 6/1995 | Spickler et al. | 439/64 |
| 5,737,582 A | * | 4/1998 | Fukuzumi | 710/301 |
| 5,812,370 A | * | 9/1998 | Moore et al. | 361/679.38 |
| 5,889,649 A | * | 3/1999 | Nabetani et al. | 361/679.38 |
| 6,264,506 B1 | * | 7/2001 | Yasufuku et al. | 439/638 |
| 6,343,018 B1 | * | 1/2002 | Takeyama et al. | 361/737 |
| 6,343,945 B1 | * | 2/2002 | Liikanen | 439/160 |
| 6,382,995 B1 | * | 5/2002 | Bricaud et al. | 439/159 |
| 6,408,352 B1 | * | 6/2002 | Hosaka et al. | 710/301 |
| 6,447,313 B1 | * | 9/2002 | Zuin | 439/159 |
| 6,595,803 B2 | * | 7/2003 | Akagi et al. | 439/630 |
| 6,757,172 B2 | * | 6/2004 | Maruyama | 361/737 |
| 6,773,280 B2 | * | 8/2004 | Sasaki et al. | 439/159 |
| 6,796,806 B2 | * | 9/2004 | Boutros et al. | 439/76.1 |
| 6,984,140 B2 | * | 1/2006 | Juret et al. | 439/159 |
| 7,018,227 B2 | * | 3/2006 | Takahashi | 439/347 |
| 7,066,748 B2 | * | 6/2006 | Bricaud et al. | 439/159 |
| 7,220,148 B2 | | 5/2007 | Zhao et al. | |
| 7,252,522 B2 | * | 8/2007 | Ooya et al. | 439/159 |
| 7,303,414 B2 | * | 12/2007 | Chen et al. | 439/155 |
| 7,396,243 B1 | * | 7/2008 | Lai | 439/159 |
| 7,442,044 B2 | * | 10/2008 | Yang et al. | 439/64 |
| 7,581,986 B2 | * | 9/2009 | Sakamoto et al. | 439/570 |
| 8,056,813 B2 | * | 11/2011 | Long et al. | 235/486 |
| 2001/0008815 A1 | * | 7/2001 | Zuin | 439/327 |

* cited by examiner

*Primary Examiner* — Neil Abrams
(74) *Attorney, Agent, or Firm* — Wei Te Chung; Ming Chieh Chang

(57) ABSTRACT

An electrical connector includes an insulting housing defining a receiving room and an inserting opening through which the module is inserted in the receiving room in an inserting direction. A plurality of contacts are retained in the housing and each contact comprises an engaging portion extending in the receiving room. A pair of latching structures is located in front of the inserting opening to limit the module in the receiving room in the inserting direction of the module, the latching structures being urged to move downward to allow the module into the receiving room.

9 Claims, 8 Drawing Sheets

ELECTRICAL CONNECTOR WITH LATCHES HOLDING MODULE IN PLACE

BACKGROUND OF THE INVENTION

1. Field of the Invention

The present invention relates to an electrical connector, and more particularly to an electrical connector incorporated with metallic holding arrangement in which an inserted card-like component or similar module can be readily and securely retained therein.

2. Description of the Related Art

U.S. Pat. No. 7,220,148 issued to Shan-Ji Zhao on May 22, 2007 disclosed a conventional electrical connector for electrically connecting a module with a PCB. The electrical connector comprises an insulting housing, a plurality of contacts secured in the housing and a metal cover pivotally connected to the housing. The cover defines a pivotal pin and a free end rotating around the pivotal pin. The cover is positioned on the housing and forms an inserting opening with the housing at the free end of which width is smaller than the width of the module. So when the module is inserted into the housing, the cover must be rotated from a closed location to an opened location. But during rotation of the cover, the cover is easy to be damaged. Moreover the assembly process of the cover to the housing is complicate.

In view of the above, a new electrical connector that overcomes the above-mentioned disadvantages is desired.

SUMMARY OF THE INVENTION

Accordingly, an object of the present invention is to provide an electrical connector incorporated with a holding arrangement in which a module can be readily inserted and securely retained therein.

To fulfill the above-mentioned object, an electrical connector includes an insulting housing defining a receiving room and an inserting opening through which the module is inserted in the receiving room in an inserting direction. A plurality of contacts are retained in the housing and each contact comprises an engaging portion extending in the receiving room. A pair of latching structures is located in front of the inserting opening to limit the module in the receiving room in the inserting direction of the module, the latching structures being urged to move downward to allow the module into the receiving room.

Other objects, advantages and novel features of the invention will become more apparent from the following detailed description when taken in conjunction with the accompanying drawings.

BRIEF DESCRIPTION OF THE DRAWINGS

FIG. 4 is a perspective view of the electrical connector show in FIG. 3, wherein the module is removed partly from;

FIG. 7 is an perspective view of the electrical connector shown in FIG. 6, wherein the module is removed partly from.

DETAILED DESCRIPTION OF THE PREFERRED EMBODIMENT OF THE INVENTION

Reference will now be made to the drawings to describe the present invention in detail.

Figure 1:
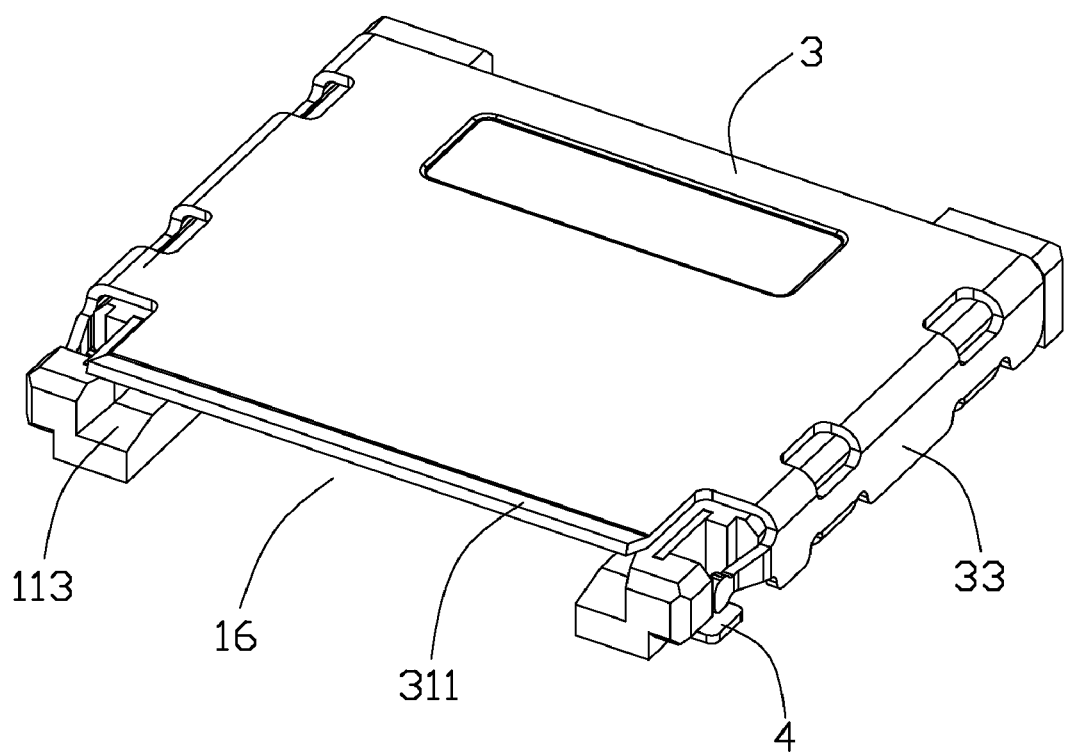
FIG. 1 is a perspective view of an electrical connector in accordance with a first embodiment of the present invention.
Figure 2:
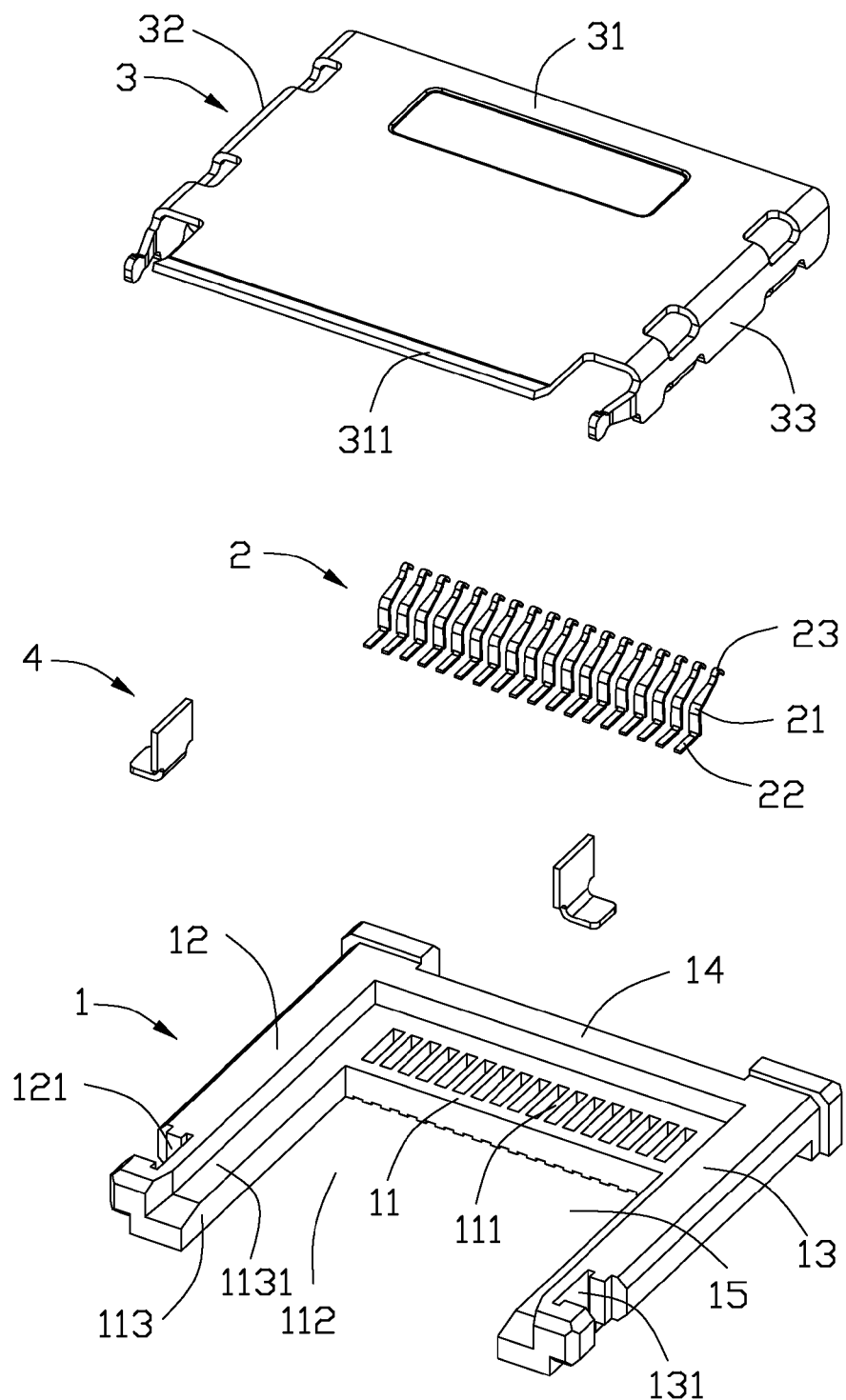
FIG. 2 is an exploded perspective view of the electrical connector of FIG. 1.

Referring to FIGS. 1-2, an electrical connector for receiving a card-like component or similar module therein, comprises an insulating housing 1, a plurality of contacts 2 secured in the housing, a metal shell 3 covering on the housing and a pair of reinforced pieces 4 positioned on two opposite sides of the housing.

The insulating housing 1 comprises a bottom wall 11 and a plurality of sidewalls extending upwards from the bottom wall 11. The sidewalls include a left sidewall 12 and a right sidewall 13 on the two opposite sides of the bottom wall 11, and a back wall 14 between and bridging the left and right sidewalls 12, 13. The shell 3 and the sidewalls of the housing 1 commonly define a receiving room 15, and an inserting opening 16 opposite to the back wall 14 through which the module is inserted in the receiving room 15. The width of inserting opening 16 is not smaller than the width of the module so that the module can directly be inserted in the receiving room 15. The bottom wall 11 further defines a notch 112 running forward and remains a terminal-located portion 111 adjacent to the back wall 14 to arrange the contacts 2 and two sliding portions 113 adjacent to the sidewalls with a sliding face 1131 which is coplanar to the inner face of bottom wall 11.

The left and right sidewalls 12, 13 respectively define a groove 121, 131 to receive the reinforced pieces 4 respectively at outside thereof. Each reinforced piece 4 is configured with an L-shaped manner. One end of the reinforced piece 4 is retained in the housing 1 and the other end is soldering on the PCB (not shown).

Each contact 2 comprises a retaining portion 21 retained in the insulting housing 1, a soldering portion 22 extending out the bottom face of the insulting housing 1 and an engaging portion 23 slanting upward in the receiving room 15 to contact with the module. The terminal-location portion 111 of the bottom wall 11 of the housing 1 defines a plurality of receiving passageways (not labeled) to receive the contacts 2.

The shell 3 comprises a top plate 31 and a pair of side plates 32, 33 extending downwardly from two sides of the top plate 31. Those two side plates 32, 33 wrap the left and right sidewall 12, 13 by grabs (not labeled) bending inwards to be retained on the housing 1. The shell 3 further includes a guiding portion 311 extending upwards-slantingly from a front end of the shell 3 and above the inserting opening 16 to guide the module into the receiving room 15.

Since the inserting opening 16 is equal or larger than the module 100, so the module can directly be inserted from the opening 16 without rotation the shell 3. The second and third embodiments illustrate that the latching structures are incorporated with arrangement in which the module 100 is prevented from getting loosed from the receiving room. The similar structures to the first embodiment will not be described for simply.

Figure 3:
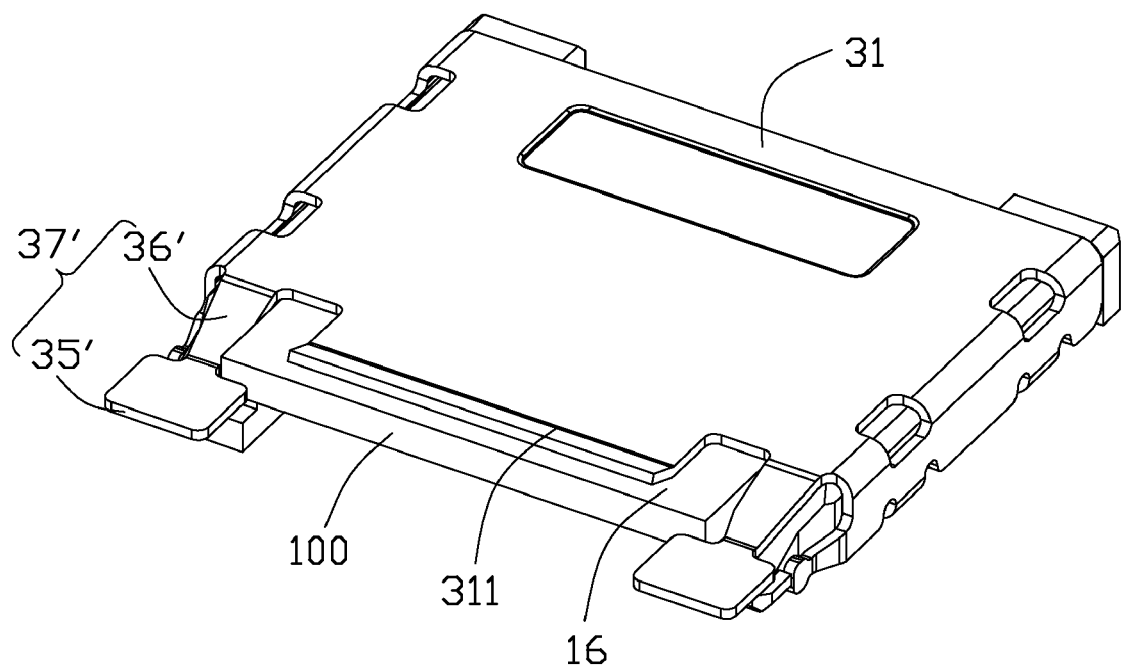
FIG. 3 is a perspective view of an electrical connector receiving a module in accordance with a second embodiment of the present invention.
Figure 4:
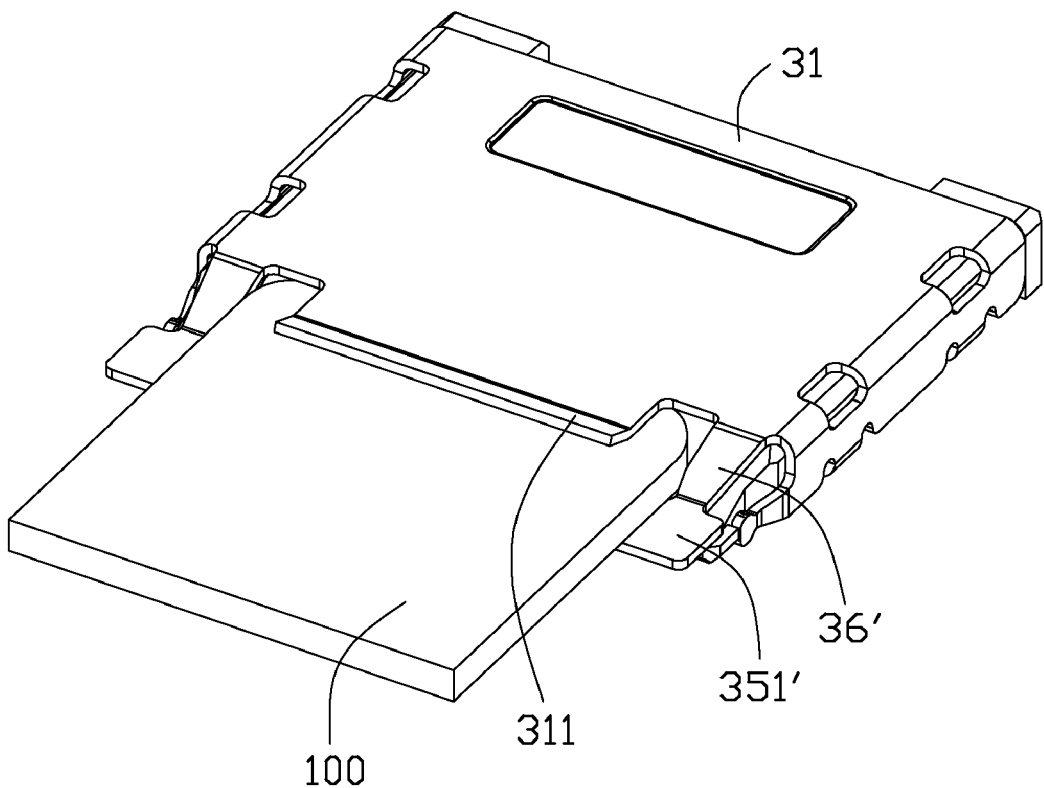
Figure 5:
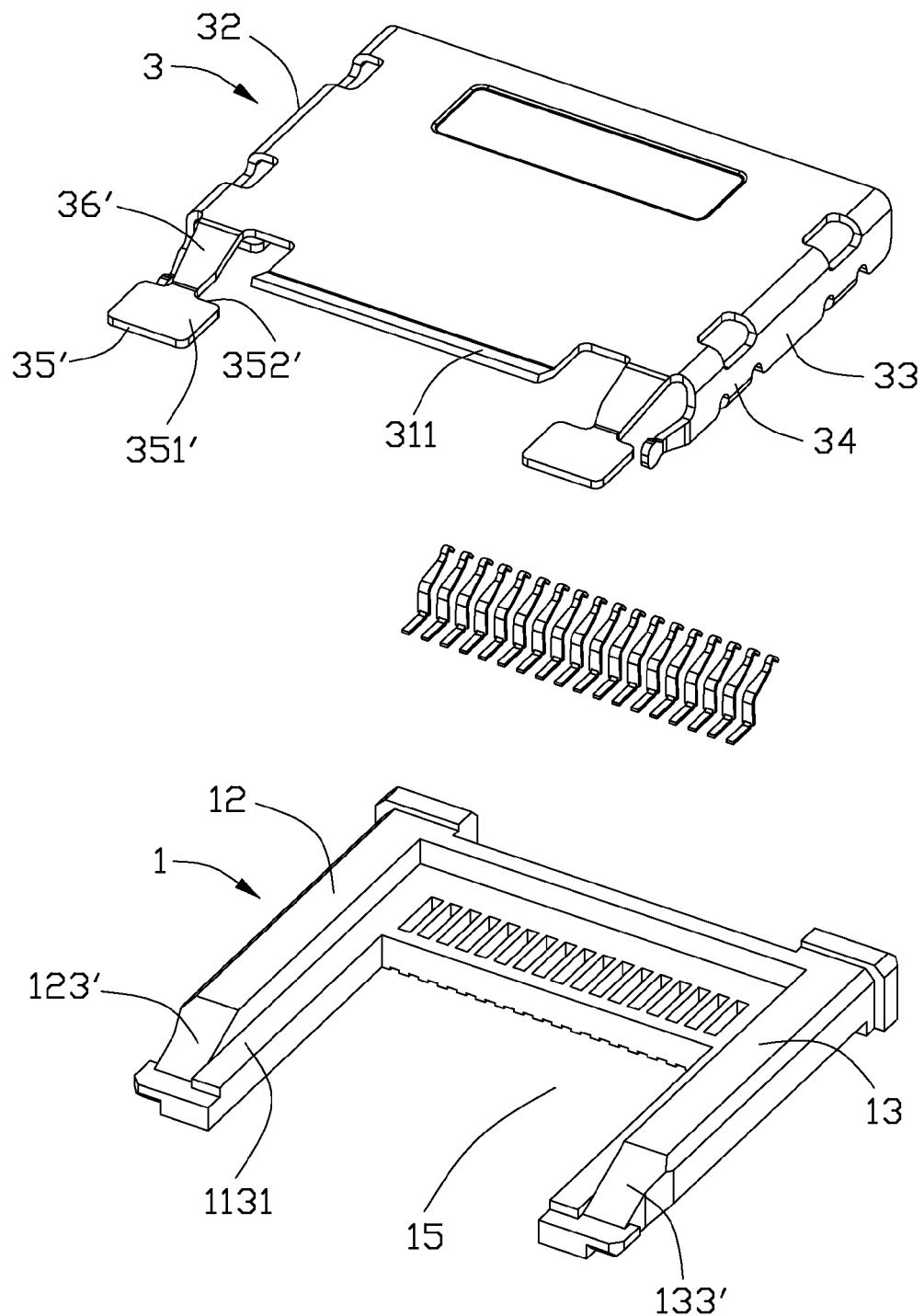
FIG. 5 is an exploded perspective view of the electrical connector of FIG. 3.

Referring to FIGS. 3-5 showing the second embodiment of the present invention, a metal shell 3 further defines a pair of latching structures 37' located at two sides of the inserting opening 16. The latching structures 37' include a pair of stopping pieces 35' resisting on a front of the module 100 to prevent the module 100 from dropping out of the receiving room 15 of the housing 1 and a pair of connecting portions 36' to connect corresponding stopping pieces 35' to the top plate 31 of the shell 3. Each connecting portion 36' is narrower than the stopping pieces 35' and the distance between said two connecting portions 36' is equal to the width of the opening 16 to limit the module 100 in the receiving room 15 along a lateral direction perpendicular to the inserting direction of the module 100. The stopping portions 35' are located before the connecting portions 36' and at least partly projecting into the opening 16. The stopping pieces 35' can move upwards and downwards elastically with the connecting portion 36'. Each stopping piece 35' defines a bearing face 351' on the top face thereof and a limited edge 352' on an inward-facing edge. During assembling, the module 100 is inserted into the opening 16 with an angle along the guiding portion 311, and then the rear portion of the module 100 pushes the bearing face 351' down and further slides along the sliding faces 1131 at the same time until the module 100 is completely located in the receiving room 15. After the module 100 is completely located in the receiving room 15 wherein the module 100 moves away from the bearing faces 351', the stopping pieces 35' remove up and the limited edge 352' resists at an outside of the module 100 to prevent the module 100 from dropping out of the receiving room 15. The left and right sidewall 12, 13 further define supporting portions 123', 133'. When the latching structure 37' are pushed down by the module 100, the latching structures 37' resist on the supporting portions to avoid the latching structures 37' to deform excessively. Each supporting portion defines a bevel face supporting the connecting portion 36' and a horizontal face supporting the stopping piece 35'. The metal shell 3 further defines a plurality of reinforced pieces 34' extending from one side plate 33 to the other side plate 34 and wrapping the sidewall 13 to secure the housing 1 and the shell 3.

Figure 6:
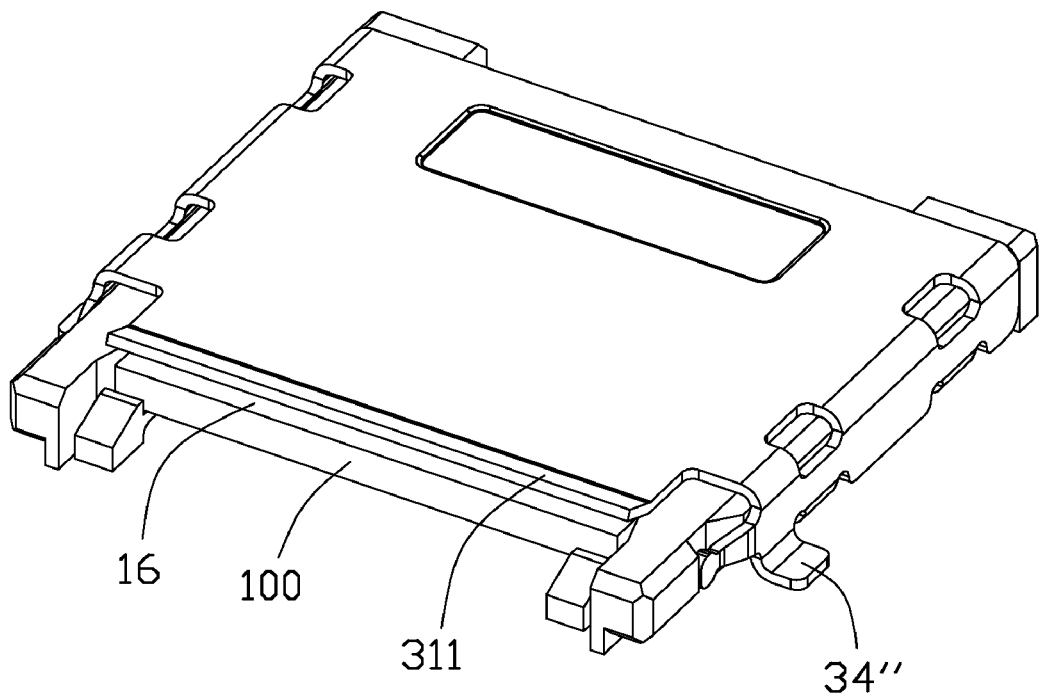
FIG. 6 is a perspective view of an electrical connector receiving a module in accordance with a third embodiment of the present invention.
Figure 7:
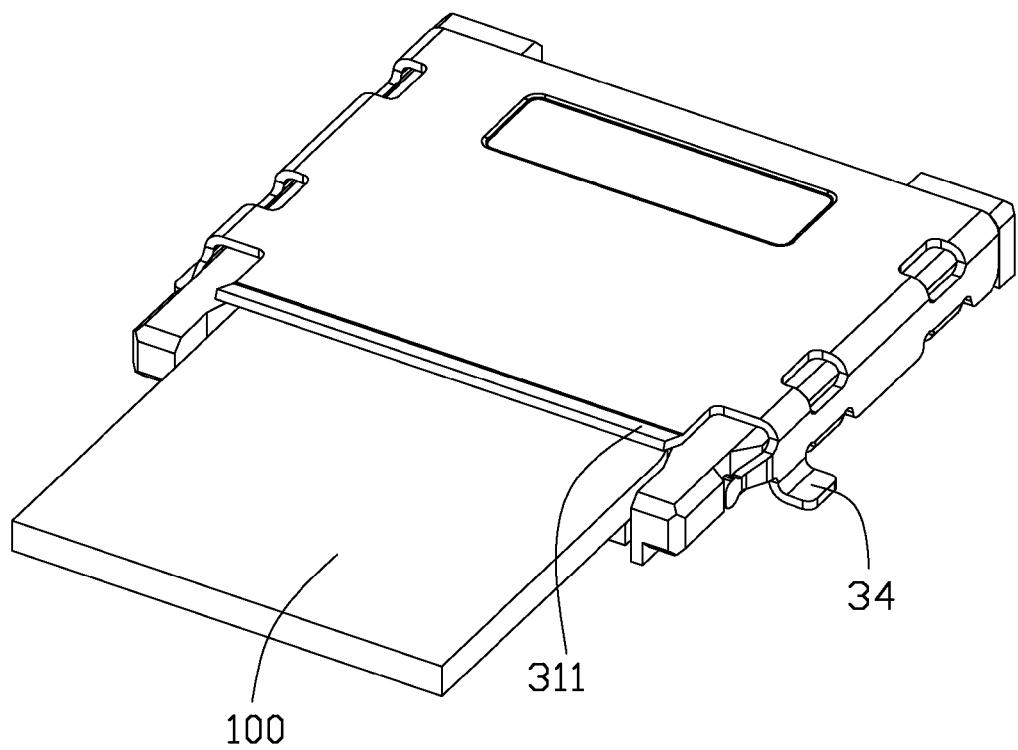
Figure 8:
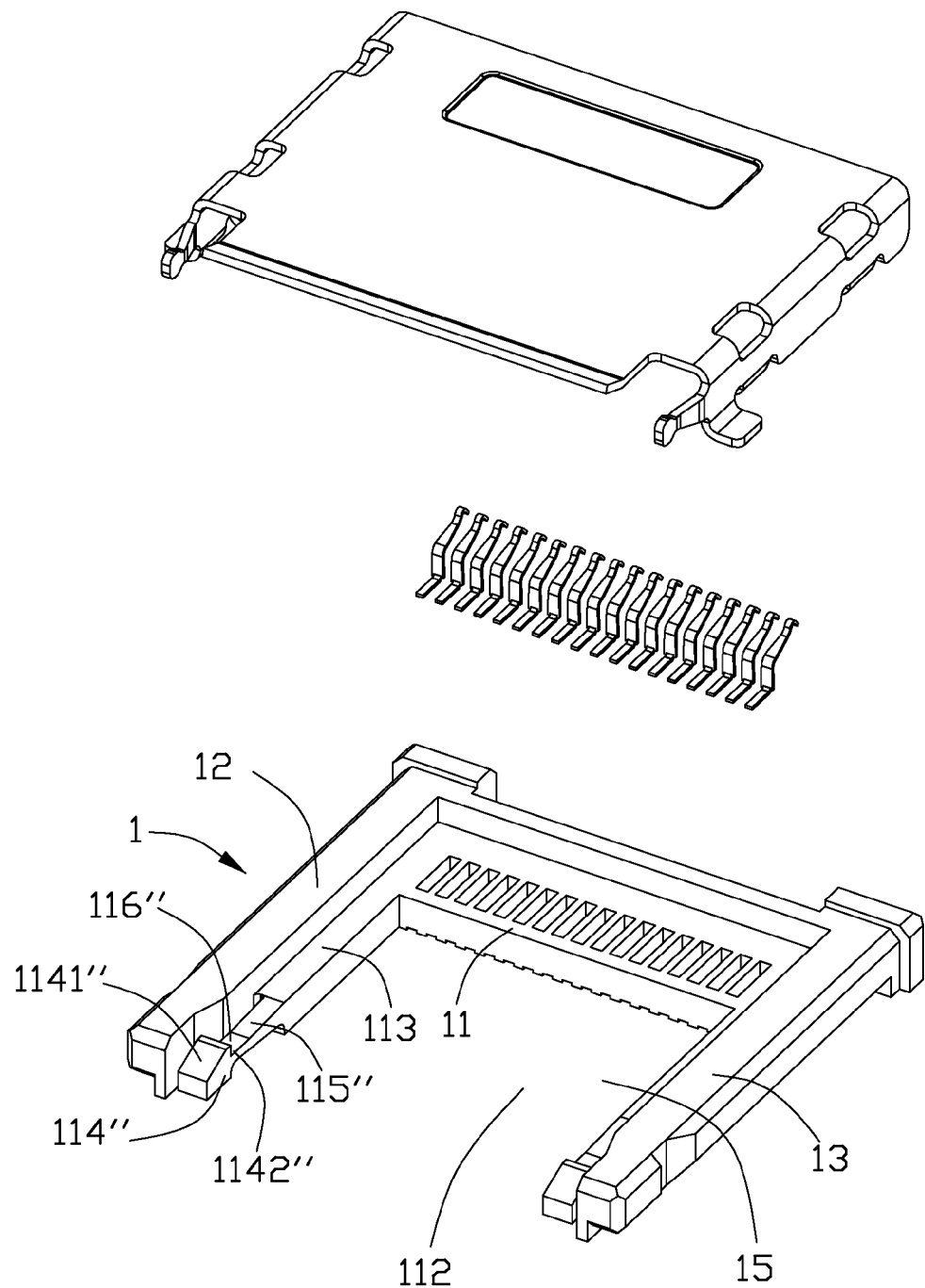
FIG. 8 is an exploded perspective view of the electrical connector of FIG. 6.

Referring to FIGS. 6-8 illustrating the third embodiment of the invention which have latching structures formed on the insulating housing 1, the bottom wall 11 of the housing 1 further defines a pair of latching structures 116" on the two sides of the notch 112 and between the left and right sidewall 12, 13. The latching structures 116" include a pair of stopping blocks 114" located in front of the inserting opening 16 and a pair of connecting portions 115" connecting the stopping blocks 114" to the sliding portion 113. The stopping blocks 114" can move upwards and downwards elastically and each stopping block defines a bearing face 1141" on the top face thereof extending slantly and a limited edge 1142" on an inward-facing edge. During assembling, the module 100 is inserting into the opening 16 with an angle along the guiding portion 311, and then the module 100 pushes the bearing face 1141" down and further slides along the sliding face 1131 until the module 100 is completely located in the receiving room 15. After the module 100 is completely located in the receiving room 15 wherein the module 100 moves away from the bearing faces 1141", the stopping blocks 114" remove up and the limit edge 1142" resists at an outside of the module 100 to prevent the module 100 from dropping out of the receiving room 15. The metal shell 3 defines a plurality of reinforce pieces 34" extending from one side plate opposite to the other side plate to secure the electrical connector to the PCB.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical connector for receiving a card-like module, comprising:
    an insulting housing defining a receiving room and an inserting opening through which the module is inserted in the receiving room in an inserting direction;
    a plurality of contacts retained in the housing and each contact comprising an engaging portion extending in the receiving room; and
    a metal shell loaded on the housing and covering on the receiving room;
    wherein a pair of latching structures extending from a front edge of the metal shell and located in front of the inserting opening, the latching structures comprises a pair of stopping portions with an inward-facing edge resisted at an outside of the module in a condition that the stopping portions are urged to move downward to allow the module into the receiving room and restored to prevent the module from falling from the receiving room.

2. The electrical connector as claimed in claim 1, wherein the latching structures comprise a pair of connecting portions connecting the stopping portions to the front edge of the shell, distance between the connecting portions is equal to width of the module while and distance between the two stopping portions is smaller than the width of the module.

3. The electrical connector as claimed in claim 2, wherein the shell includes a guiding portion extending upwards-slantingly from the front end of the shell, the module is inserted into the opening with an angle along the guiding portion.

4. The electrical connector as claimed in claim 1, wherein the metal shell defines a pair of inward-slanting sparing arms unitarily extending forwards therefrom press in a pair of slots defined at outer faces of the sidewalls of the insulative housing.

5. An electrical connector comprising:
    an insulative housing extending horizontally and defining a receiving room in a vertical direction;
    a plurality of contacts disposed in the housing with contacting sections exposed into the receiving room in said vertical direction;
    a metallic shell assembled to the housing and covering on a top of said receiving room in said vertical direction while leaving an insertion opening through which a module is allowed to be inserted into the receiving room in a front-to-back direction perpendicular to said vertical direction; and
    at least one latch extending downward from a top wall of the metal shell and located around the insertion opening and deflectable in the vertical direction;
    wherein said latch defines a stopping piece with a bearing face facing toward the shell in the vertical direction to commonly define an insertion passage therebetween in said vertical direction for guidable insertion of the module, and further with a limiting edge facing toward the receiving room in said front-to-back direction for locking of the module;
    wherein the stopping piece is forced to move away from the shell in said vertical direction for enlarging a space therebetween during insertion of the module.

6. The electrical connector as claimed in claim 5, wherein the shell defines a front edge beyond which the stopper piece extends forwardly.

7. The electrical connector as claimed in claim 5, further including a solder pad located on a lateral side of the housing for mounting to a printed circuit board.

8. The electrical connector as claimed in claim 5, wherein the metal shell defines a pair of inward-slanting sparing arms unitarily extending forwards therefrom press in a pair of slots defined at outer faces of the sidewalls of the insulative housing.

9. An electrical connector comprising:

an insulative housing comprising a bottom wall and two sidewalls;

a metal shell covering above a top of the insulative housing, thereby defining a receiving room among the insulative housing and the metal shell, the metallic shell comprising a pair of lateral walls retained on the sidewalls of the insulative housing respectively; and a plurality of contacts disposed in the bottom wall with contacting sections exposed into the receiving room;

wherein a pair of inward-slanting sparing arms unitarily extend forwards from the pair of lateral walls of the shell and press in a pair of slots defined at outer faces of the sidewalls of the insulative housing.

\* \* \* \* \*